(12) United States Patent
Ogden

(10) Patent No.: US 6,729,585 B2
(45) Date of Patent: May 4, 2004

(54) SUPPORTING MEANS FOR ELONGATED BUILDING SERVICES SUPPLY MEANS

(75) Inventor: Bruce Ogden, Menai (AU)

(73) Assignee: FCI, Versailles (FR)

( * ) Notice: Subject to any disclaimer, the term of this patent is extended or adjusted under 35 U.S.C. 154(b) by 0 days.

(21) Appl. No.: 10/033,106

(22) Filed: Oct. 26, 2001

(65) Prior Publication Data
US 2003/0006347 A1 Jan. 9, 2003

(30) Foreign Application Priority Data
Oct. 30, 2000 (AU) .............................. 69622/00

(51) Int. Cl.[7] .............................. E21F 17/02; F16L 3/00
(52) U.S. Cl. .......................... 248/58; 248/68.1; 248/49; 24/457; 24/545; 403/329
(58) Field of Search .............. 248/68.1, 74.2, 248/229.16, 228.7, 58, 49, 243, 244; 174/68.3, 68.1, 101, 97; 403/387, 326, 327, 329; 24/601.2, 457, 458, 545, 456; 211/181.1, 87.01, 85.7

(56) References Cited

U.S. PATENT DOCUMENTS

| 656,274 | A | * | 8/1900 | Streeter | |
|---|---|---|---|---|---|
| 718,545 | A | * | 1/1903 | Streeter | |
| 749,222 | A | * | 1/1904 | Purdy | |
| 3,161,263 | A | * | 12/1964 | Stokes | |
| 3,485,467 | A | * | 12/1969 | Fuchs et al. | 174/97 |
| 5,564,658 | A |   | 10/1996 | Rinderer | 248/58 |
| 5,634,614 | A | * | 6/1997 | Rinderer | 248/58 |
| 5,730,400 | A | * | 3/1998 | Rinderer et al. | 248/680 |
| 6,198,047 | B1 | * | 3/2001 | Barr | 174/68.3 |

FOREIGN PATENT DOCUMENTS

| AU | 199943515 A1 | 3/2000 |
|---|---|---|
| WO | WO 98/24160 | 6/1998 |

* cited by examiner

Primary Examiner—Gwendolyn Baxter
(74) Attorney, Agent, or Firm—Harrington & Smith, LLP

(57) ABSTRACT

A cable tray comprises a sheet metal central spine (10), comprising a channel web (12) and two channel flanges (13), and a plurality of cantilever bearer elements (11). Each bearer element is affixed to the spine by a spring clip (22) comprising two resilient tongues (23) adapted to clasp the spine between themselves. Each tongue has a barb formation (24) at its free end overlying a margin of the web, and a stud (25) extending into a hole (14) in the adjacent flange.

17 Claims, 6 Drawing Sheets

SUPPORTING MEANS FOR ELONGATED BUILDING SERVICES SUPPLY MEANS

TECHNICAL FIELD

This invention relates to supporting means for elongated building services supply means. Such service supply means may be electric power cables, communication cables, water or gas pipes or other elongated means for the supply or distribution of services within a building. Such supporting means necessarily include one or more bearer elements on which the service supply means rest. Typically the bearer element has been the floor of a tray or trough fixedly associated with the building being serviced, for example carried by wall brackets or suspended from a ceiling or other overhead building component by tie rods or the like. Probably the most frequently occurring service supply means are electric cables, and for that reason, supporting means of the kind to which the invention relates are usually referred to in the art as "cable trays", irrespective of the service supply means that may be supported in any instance, and notwithstanding recent departures in the form of the bearer elements from that of an integral floor of a traditional tray or trough. When convenient that term of art is used accordingly hereinafter.

BACKGROUND ART

As stated above, traditionally the bearer elements of cable trays comprised the floor of a shallow trough or elongated tray. The service supply means resided within the trough. The trough including its floor was constructed from sheet material, for example steel, plastics or fibrous cement.

Alternatively, at least the floor of the trough has been made of expanded metal sheet. This is preferred as it eliminates the possibility of the trough retaining water or detritus that may be damaging to the service supply means.

In other instances floor-like bearer elements came to be replaced by a plurality of spaced apart rungs extending between rigid stiles. The wall brackets or tie rods are affixed to the stiles, so that the supporting means as a whole resemble a conventional ladder in a substantially horizontal disposition. Such ladder-like supporting means are still customarily referred to as cable trays.

In more recent times, the stiles of such ladder-like cable trays have been replaced by a central spine, and the rungs by a plurality of spaced apart bearer elements extending as cantilevers from each side of the spine. The bearer elements preferably have upturned free end parts, so as to retain the service supply means. This is advantageous as the service supply means may be placed on the bearer elements from the sides, instead of having to be pulled into position from one end of the cable tray.

The last mentioned prior art is well exemplified by the published specification of Australian patent application 99/943515 and the International publication WO 98/24160 of International application PCT/AU/00788 (both in the name of Ramset Fasteners (Aust) Pty Ltd). In that cited cited prior art the spine is a rectangular sectioned tube, and the cantilever bearer elements extend through clearance openings piercing the tube walls. It is apparent that the upturned free ends of the cantilever bearer elements are formed after the elements have been passed through those openings, otherwise it would not be possible to put them in place. This is disadvantageous, as it would require expensive manual operations or the use of complex special purpose machines in the manufacture of the cited prior art cable trays.

SUMMARY OF THE INVENTION

An object of the present invention is to alleviate the aforesaid disadvantage of the prior art. A further object is to provide for the on-site selection of the spacing between discrete bearer elements to suit the degree of pliability of the service supply means in any instance.

The invention is well adapted for use in relation to cable trays comprising a single spine and a plurality of discrete cantilever bearer elements, although it will be apparent to the skilled addressee that it is also applicable to ladder-like cable trays having two or more parallel spines and a plurality of discrete rung-like bearer elements.

The invention, in its broadest aspect, consists in supporting means for elongated building service supply means of the kind comprising at least one spine and a plurality of discrete bearer elements affixed to said at least one spine, characterised in that each bearer element is affixed to said at least one spine by a spring clip fixedly associated with said each bearer element.

For preference the spring clip is formed integrally with its associated bearer element.

According to a second aspect, the invention consists in supporting means according to the first aspect wherein there are at least an equal plurality of locating formations on said spine each able to be engaged by a co-acting locating formation on a said spring clip to thereafter resist disengagement of the bearer elements from the spine.

In preferred embodiments of the second aspect of the invention the spine is an inverted channel section comprising a channel web and two channel flanges, said locating formations comprise a longitudinally extending row of spaced apart holes in each of the channel flanges, each spring clip comprises two upwardly directed, spaced apart resilient tongues projecting from the clip's associated bearer element, each with a barb formation at or near its free end directed towards the other and each with a stud intermediate its ends projecting towards the other constituting said co-acting locating formations; the arrangement being such that the tongues of each clip may clasp the spine between them with the barbs of the tongues overlying respective margins of the channel web and with the studs on each tongue extending into a respective hole in the adjacent channel flange.

Furthermore, for preference, in the last mentioned embodiments each bearer element defines a groove at or near the root of each of its tongues in which a free edge margin of the adjacent channel flange is received when the barb formations overlie the margins of the channel web and the studs are homed in the holes.

By way of example, a preferred embodiment of the above-described invention is described in more detail hereinafter with reference to the accompanying drawings.

BEST MODE OF PUTTING THE INVENTION INTO EFFECT

Figure 1:
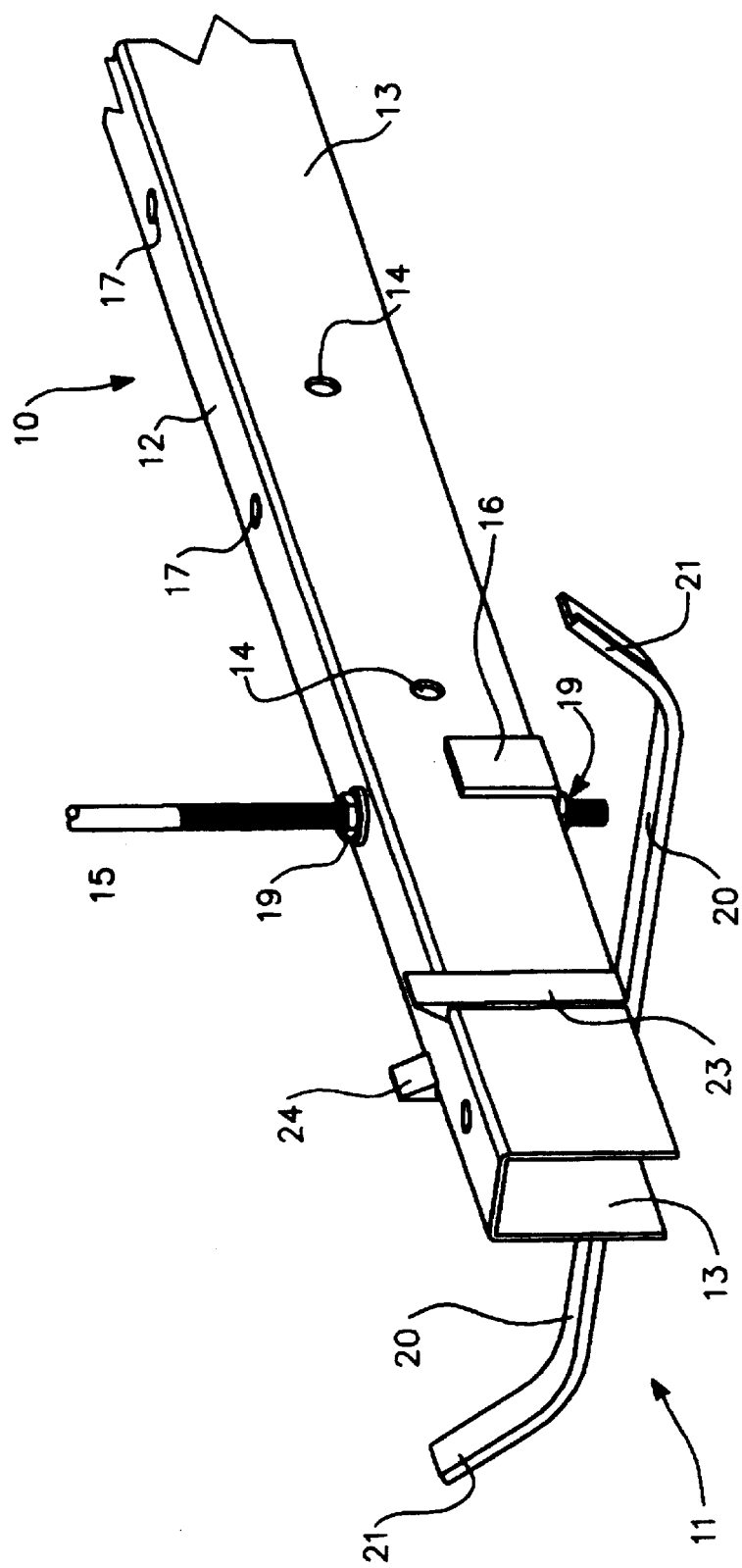
FIG. 1 is a perspective view of an end portion of a supporting means according to the invention.
Figure 2:
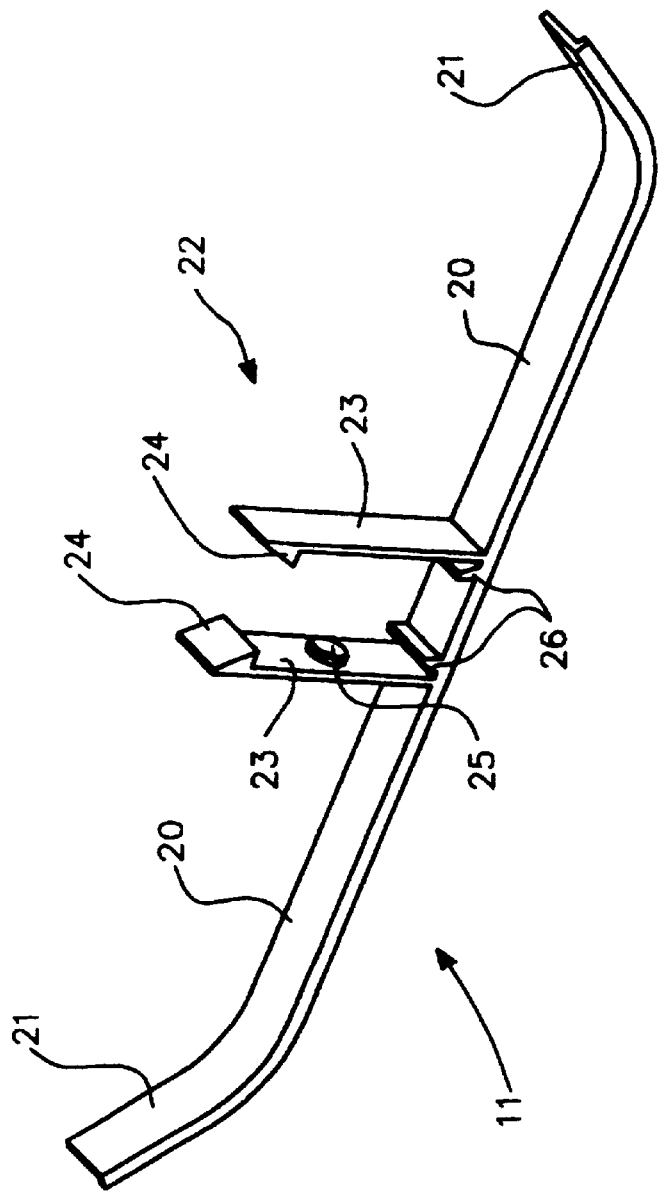
FIG. 2 is a perspective view of a bearer element, being a component of the supporting means of FIG. 1

The supporting means illustrated by the drawings comprises a spine 10 and a plurality of bearer elements 11 spaced along the spine 10, of which only one appears in the drawings.

Figure 7:
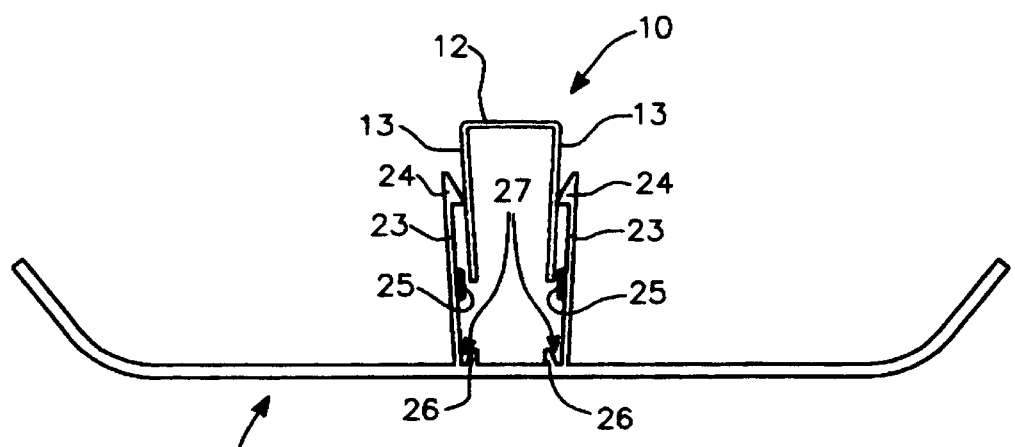
FIG. 7 is an end elevation of the spine of FIG. 4 and a side elevation of the bearer element of FIG. 2 at an early stage of their assembly into the supporting means of FIG. 1, drawn to a reduced scale.
Figure 9:
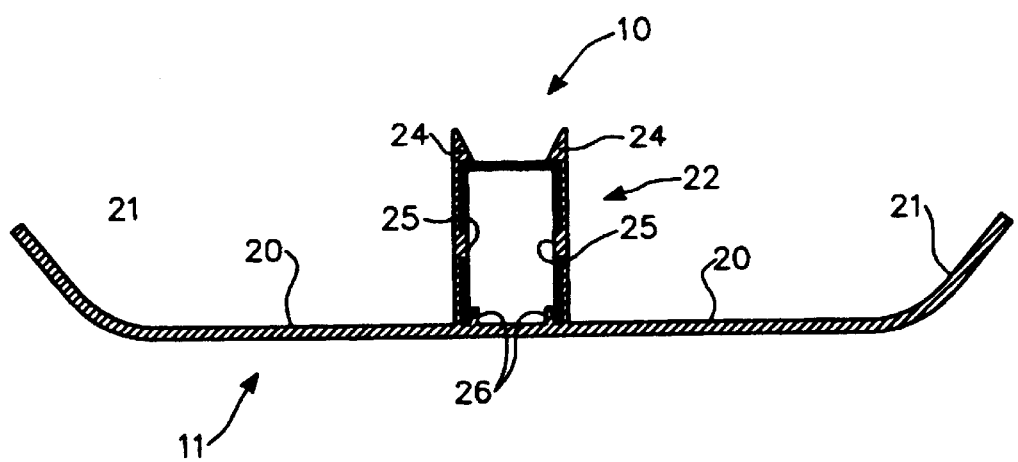
FIG. 9 is a cross-sectional elevation of the spine and bearer element of FIG. 7 at the end of the assembly.

The spine 10 is a length of inverted channel section comprising a channel web 12 and two channel flanges 13. It may be roll or press formed from sheet steel, preferably coated with a rust resistant alloy, for example an aluminium-zinc alloy. Thus the flanges 13 possess a degree of resilience, such that their free edges may be elastically pressed towards each to a limited extent, as shown in FIG. 7, but will return to their original position when the loading pressure is relaxed, as shown in FIG. 9.

The spine 10 is furnished with clip locating formations in the form of equally spaced apart holes 14, arranged in rows extending along the respective flanges 13.

In use, the spine 10 may be suspended by two or more threaded tie rods 15, of which only one appears in the drawings, extending downwardly from any appropriate, fixed, overhead component of the building being serviced. The spine 10 may be secured to each tie rod 15 by means of a U-shaped saddle 16 into which the spine 10 neatly sits. To that end the channel web 12 is pierced by a plurality of clearance holes 17 and the saddle 16 is likewise pierced by a clearance hole 18. The tie rod 15 extends through a selected hole 17 and the hole 18. The saddle 16 may then be supported by a nut and washer 19 on the tie rod, bearing against the underface of the saddle 16. If desired, the affixture of the spine to the tie rod may be made more secure by a second nut and washer 19 on the tie rod, bearing against the upper face of the web 12.

As is well known, it is customary for buildings to be dimensioned having regard to a standard modular dimension. That is to say, the major dimensions of the building conform to whole numbers of the modular dimension. This enables items such as window frames, ceiling tiles, and the like, which conform to the modular dimension, to be installed without requiring to be trimmed to size. Thus, for preference, the spine 10 is provided to the user in lengths that are a whole number multiple of the modular dimension, and the centre distances between holes 17 and holes 14 are that such one or a whole number plurality of such centre distances equals the modular dimension applicable to the building being serviced.

The bearer element 11 is preferably a moulded plastics item, for example of glass-filled nylon. It comprises two cantilever arms 20 with upturned ends 21 and an integral, central resilient clip 22.

The clip 22 comprises two, upwardly directed, resilient tongues 23. Each is furnished with a barb formation 24 at its free end, and a protruding stud 25 intermediate its ends. Each stud 25 is dimensioned to fit neatly into any of the holes 14.

Figure 6:
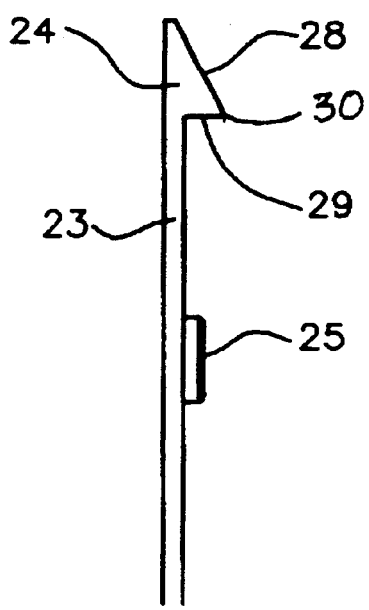
FIG. 6 is a side elevation of an upper portion of a resilient tongue, being a component of the bearer element of FIG. 2 drawn to an enlarged scale.

As may best be seen in FIG. 6, each barb formation 24 presents an inclined upper face 28 and a horizontal under face 29. Those faces meet at a contact line 30. It should also be noted that the barb formation 24 projects substantially further from the tongue 23 than does the stud 25.

Figure 3:
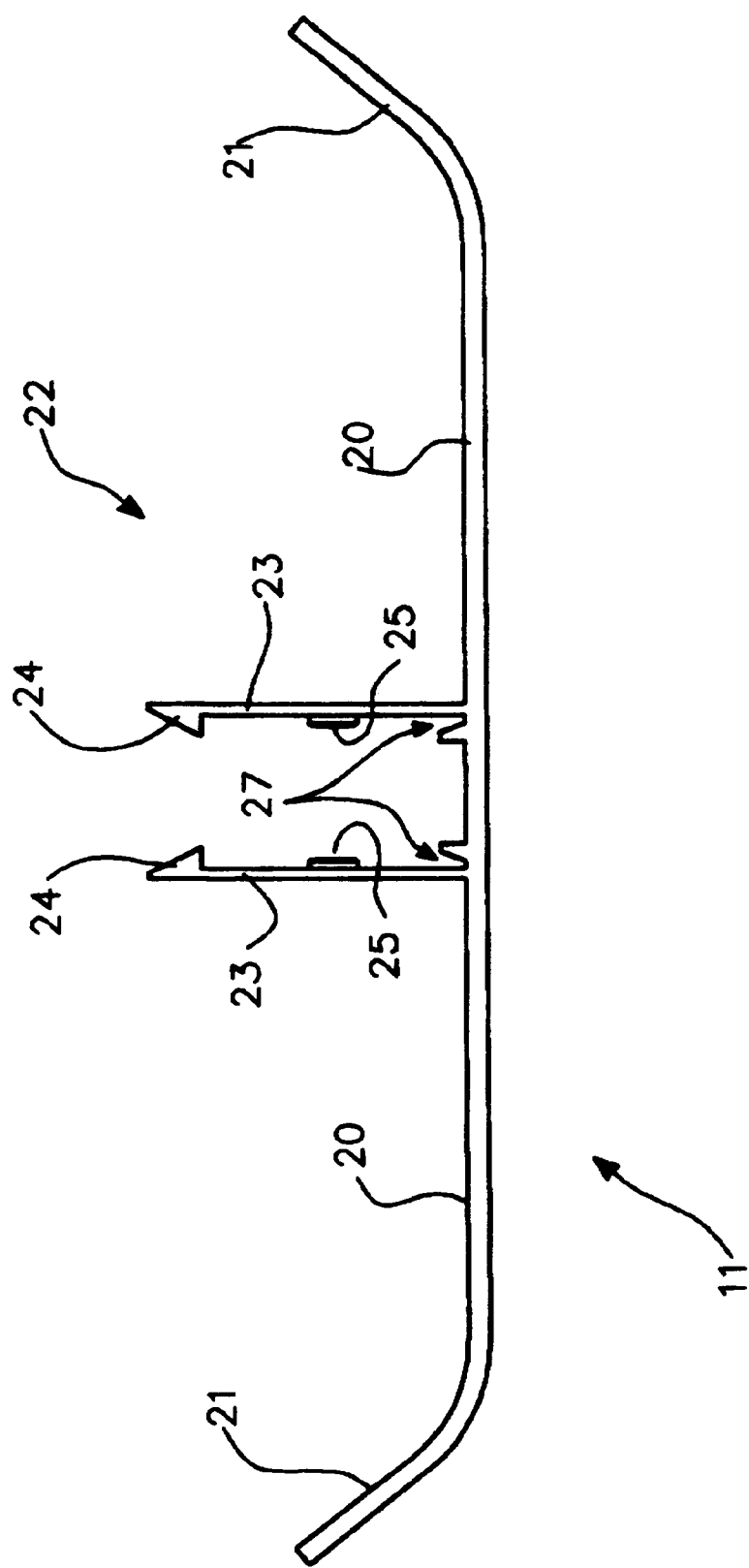
FIG. 3 a side elevation of the bearer element of FIG. 2.
Figure 4:
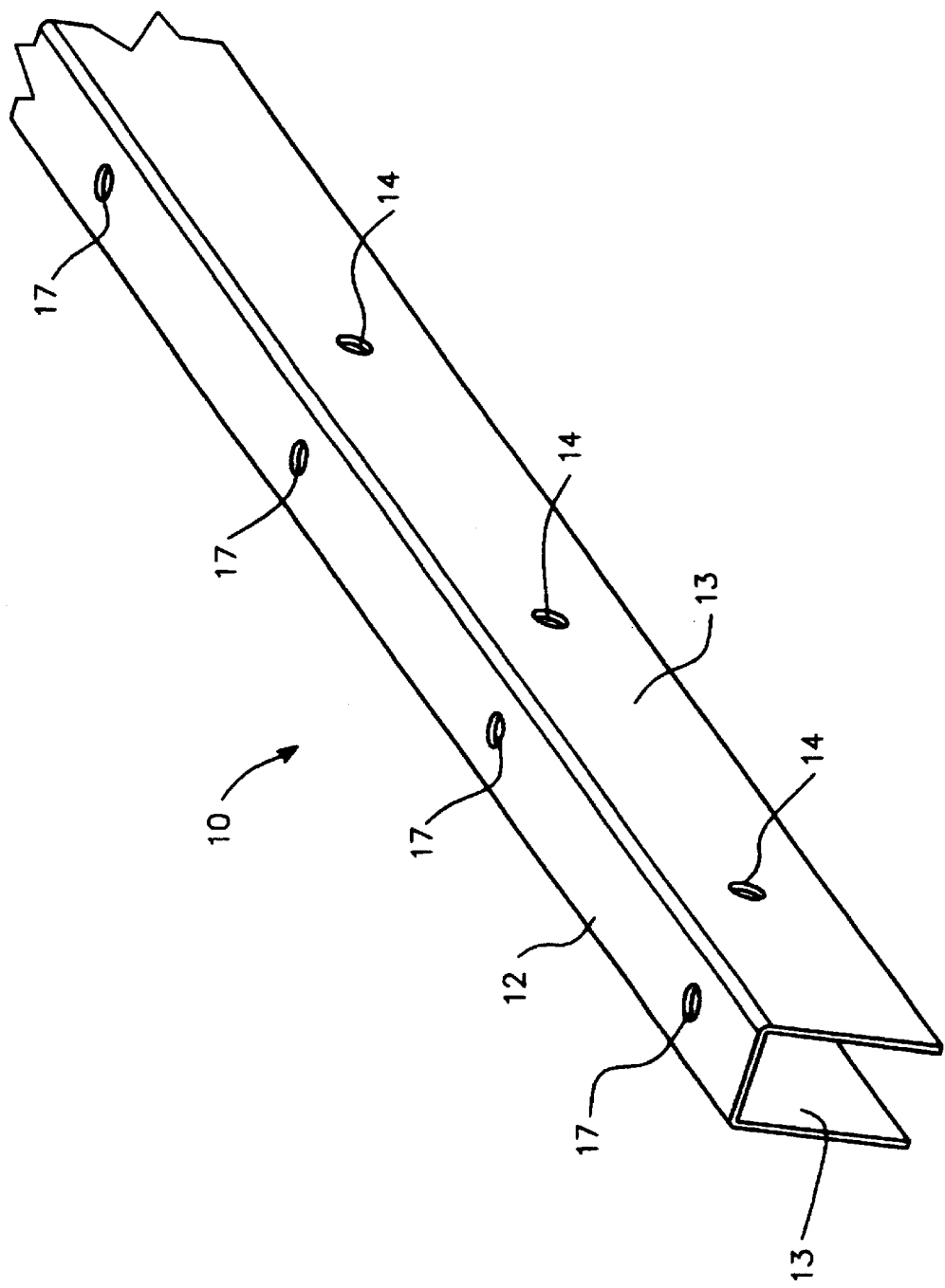
FIG. 4 is a perspective view of an end portion of a spine, being a component of the supporting means of FIG. 1
Figure 5:
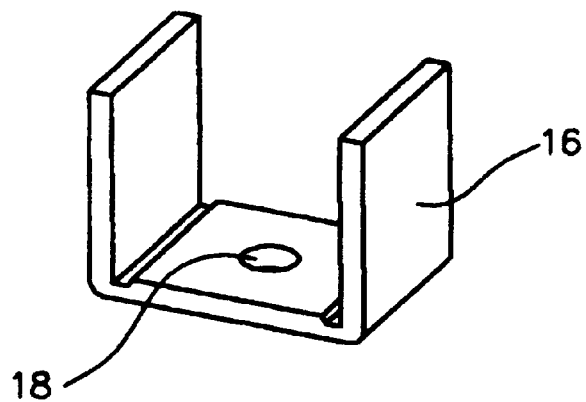
FIG. 5 is a perspective view of a U-shaped saddle.

The clip 22 further comprises two beads 26 near, but spaced from, the roots of the tongues 23. As may best be seen in FIG. 3, at least the upper margins of the faces of the beads 26 opposed to the tongues 23 are inclined, so that they and the bottom margins of the respectively adjacent tongues define two grooves 27 which are somewhat wider at the top than they are at the bottom. The grooves 27 are dimensioned so that the free end margins of the flanges 13 are a neat fit within the bottom parts of the grooves 27.

Figure 8:
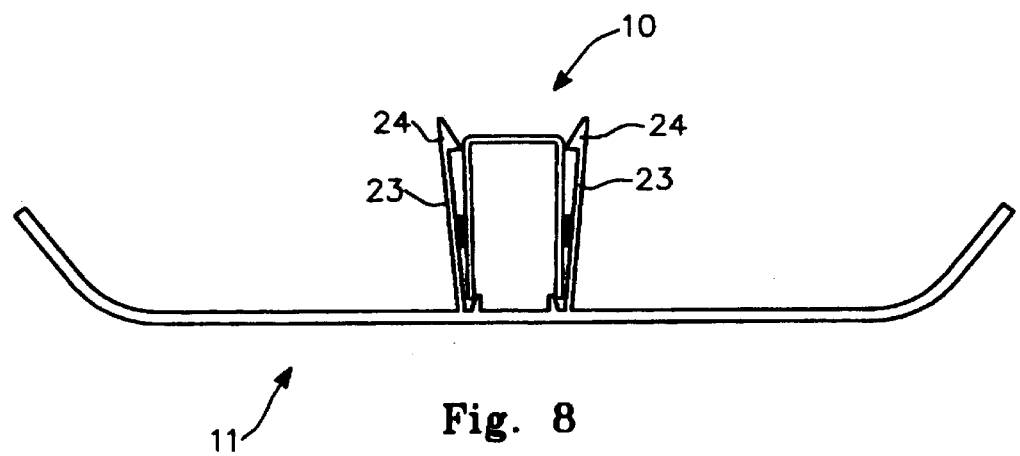
FIG. 8 is a view similar to FIG. 7 at a later stage of the assembly.

By referring particularly to FIGS. 7, 8 and 9, it will be seen that the assembly of a bearer element 11 to the spine 12, at a location corresponding to that of an opposed pair of holes 14, may be achieved simply by pushing the bearer element into position from below. At the start of that assembly operation the inclined faces 28 of the barb formations 24 bear against the free edges of the flanges 13. This assists the operator to guide the flanges 23 into position between the tongues 23. Further upward movement of the bearer element brings the contact lines 30 of the barb formations into pressure contact with the respective outer side faces of the flanges 13. This may cause the free ends of the flanges to move towards each other. More importantly, it causes the tips of the tongues 23 to be are resiliently urged apart. As the upward movement of the bearer element continues the barb formations 24 approach the web 12, so that it becomes progressively more difficult for them to deflect the flanges 13. As a result, the tongues 23 are spread further apart. The extent to which the barb formations 24 project from the tongues beyond that of the studs 25 is such that the studs are held clear of the flanges 13 during the upward movement of the bearer element relative to the spine. When when the contact line 30 approaches the web 12, barb formations 24 are no longer able to deflect the flanges 13 to a significant degree, which return substantially to there undeformed position, and their free edge margins may enter the grooves 27 (see FIG. 8). As soon as the barb formations pass beyond the web 12 the tongues 23 spring back to their undeflected position, the studs 25 enter the respective holes 14, the flanges 13 become fully homed in the grooves 27, and the now substantially horizontal underfaces of the barb formations come into overlying contact with the margins of the upper face of the web 12.

Thus, the bearer element 11 becomes very firmly affixed to the spine 10, at least insofar as downward loads on the bearer element are concerned, in that the studs 25 are within the holes 14, the flanges 13 are prevented from moving apart to free the studs 25, by the web 12 at one end and the beads 26 at the other end, and there are no contacting surfaces producing any reaction loading on the tongues tending to separate them.

What is claimed is:

1. A support for elongated building service supply means, of the kind comprising at least one spine and a plurality of discrete bearer elements affixed to said at least one spine, characterized in that each bearer element is affixed to said at least one spine by a spring clip fixedly associated with said each bearer element, wherein there are at least an equal plurality of locating formations on said spine each able to be engaged by a co-acting locating formation on said spring clip to thereafter resist disengagement of the bearer elements from the spine, wherein said spine has a cross-section such that said spine presents a top face having substantially horizontal margins and substantially vertical side faces and wherein each spring clip comprises two, upright spaced apart, resilient tongues adapted to clasp the spine between themselves and each having a barb formation at or near a free end of the tongues adapted to overlie a respective one of said margins.

2. A support according to claim 1 wherein each said barb formation has an inclined upper face serving to guide the spine into position between the tongues of each bearer element being offered up to the spine during the assembly of each bearer element to the spine.

3. A support according to claim 2 wherein each said locating formation on said spine comprises aligned recesses, one in each said side face, and the coacting locating formation on each spring clip comprises aligned studs, one on each tongue of the spring clip, such that the studs respectively enter the recesses as each bearer element is assembled to the spine.

4. A support according to claim 3 wherein each barb formation projects further from said associated tongue than does the stud on said associated tongue, to an extent sufficient to prevent the stud from entering said recess unless the barb formation is in position overlying the top face of the spine.

5. A support for elongated building service supply means, of the kind comprising at least one spine and a plurality of discrete bearer elements affixed to said at least one spine, characterized in that each bearer element is affixed to said at least one spine by a spring clip fixedly associated with said each bearer element, wherein there are at least an equal plurality of locating formations on said spine each able to be engaged by a co-acting locating formation on said spring clip to thereafter resist disengagement of the bearer elements from the spine, wherein said spine is an inverted channel section comprising a channel web and two channel flanges, the locating formations on the spine comprise a longitudinally extending row of spaced apart holes in each of the channel flanges, each spring clip comprises a pair of upwardly directed, spaced apart, resilient tongues projecting from the clip's associated bearer element, each tongue has a barb formation at or near the tongue's free end directed towards the other and each tongue has a stud intermediate the tongue's ends projecting towards the other constituting the co-acting locating formations; wherein the tongues of each clip may clasp the spine between them with the barbs of the tongues overlying respective margins of the channel web and the studs on each tongue extending into a respective hole in the adjacent channel flange.

6. A support according to claim 5 wherein each spring clip and said associated bearer element define a groove at or near a root of each of the tongues in which a free edge margin of the adjacent channel flange is received when the barb formations overlie the margins of the channel web and the studs are homed in the holes.

7. An elongate conductor support system bearer element comprising:
   a central snap-on clip; and
   at least two cantilevered arms extending from the clip in general opposite directions,
   wherein each bearer element is comprised of plastic as a one-piece member, and wherein the snap-on clip comprises two upwardly extending, resilient outwardly deflectable, tongues adapted to snap onto a spine of an elongate conductor support system, and wherein at least one of the tongues comprises an inwardly projecting stud adapted to be located in a hole of the spine for receiving the stud.

8. An elongate conductor support system bearer element as in claim 7 wherein each cantilevered arm comprises an upturned free end.

9. An elongate conductor support system bearer element as in claim 7 wherein both of the tongues each comprise the inwardly projecting stud.

10. An elongate conductor support system bearer element comprising:
   a central snap-on clip; and
   at least two cantilevered arms extending from the clip in general opposite directions,
   wherein each bearer element is comprised of plastic as a one-piece member, and wherein the snap-on clip comprises two upwardly extending, resilient outwardly deflectable, tongues adapted to snap onto a spine of an elongate conductor support system, and wherein the bearer elements each comprise grooves located at a bottom of the clip for receiving free bottom ends of the spine.

11. An elongate conductor support system bearer element comprising:
   a central snap-on clip; and
   at least two cantilevered arms extending from the clip in general opposite directions,
   wherein each bearer element is comprised of plastic as a one-piece member, and wherein the snap-on clip comprises two upwardly extending, resilient outwardly deflectable, tongues adapted to snap onto a spine of an elongate conductor support system, and wherein the tongues each comprise a top end with an inclined top face for resiliently wedging the tongues apart during connection of the clip to the spine, and an underface for latching a top of the spine beneath the underface.

12. An elongate conductor support system bearer element as in claim 11 wherein at least one of the tongues comprises an inwardly projecting stud for locating in a hole in the spine for receiving the stud.

13. An elongate conductor support system bearer element as in claim 12 wherein both of the tongues each comprise the inwardly projecting stud.

14. An elongate conductor support system bearer element as in claim 13 wherein the bearer elements each comprise grooves located at a bottom of the clip for receiving free bottom ends of the spine.

15. An elongate conductor support system comprising:
   a spine adapted to be suspended from an overhead building component;
   an elongate conductor support system bearer element as in claim 10 connected to the spine,
   wherein the spine comprises a general inverted U shape with two downwardly extending channel flanges connected by a channel web, and wherein bottom edges of the channel flanges form the free bottom ends of the spine.

16. An elongate conductor support system bearer element comprising:
   a snap-on clip section; and
   at least two cantilevered arms, the cantilevered arms extending from the snap-on clip section in general opposite directions,
   wherein the bearer element is comprised of resilient material, wherein the snap-on clip section comprises two tongues, wherein at least one of the tongues is adapted to outwardly deflect and then resiliently snap inward towards the other tongue and onto a spine of an elongate conductor support system, and wherein the at least one tongue comprises an inward extending projection which is adapted to extend into a hole of the spine or which is adapted to extend onto a surface of the spine opposite an insertion direction of the snap-on clip section onto the spine.

17. An elongate conductor support system bearer element as in claim 16 wherein the projection comprises an inclined top face for resiliently wedging the tongues apart during connection of the snap-on clip section to the spine, and an underface for latching a top of the spine beneath the underface.

* * * * *